(12) United States Patent
Lee et al.

(10) Patent No.: US 11,937,100 B2
(45) Date of Patent: Mar. 19, 2024

(54) METHOD AND APPARATUS FOR GENERATING POLICIES FOR IMPROVING NETWORK SYSTEM PERFORMANCE

(71) Applicant: DZS Inc., Plano, TX (US)

(72) Inventors: Wooyul Lee, Palo Alto, CA (US); Manikanden Balakrishnan, Foster City, CA (US); Sungho Yun, San Jose, CA (US); Carlos Garcia Hernandez, Campbell, CA (US); Ramya Bhagavatula, Mountain View, CA (US)

(73) Assignee: DZS Inc., Plano, TX (US)

( * ) Notice: Subject to any disclaimer, the term of this patent is extended or adjusted under 35 U.S.C. 154(b) by 0 days.

(21) Appl. No.: 16/575,101

(22) Filed: Sep. 18, 2019

(65) Prior Publication Data

US 2020/0015103 A1   Jan. 9, 2020

Related U.S. Application Data

(63) Continuation of application No. 15/315,364, filed as application No. PCT/US2014/040404 on May 30, 2014, now Pat. No. 10,440,591.

(51) Int. Cl.
*H04W 24/02* (2009.01)
*H04L 9/40* (2022.01)
(Continued)

(52) U.S. Cl.
CPC ......... *H04W 24/02* (2013.01); *H04L 41/0813* (2013.01); *H04L 41/0823* (2013.01);
(Continued)

(58) Field of Classification Search
CPC ..... H04W 48/18; H04W 28/08; H04W 84/12; H04W 84/18; H04W 36/22; H04W 24/02;
(Continued)

(56) References Cited

U.S. PATENT DOCUMENTS

| | | | |
|---|---|---|---|
| 8,582,458 B2 * | 11/2013 | Robbins | ................ H04W 24/06 370/252 |
| 9,271,208 B2 | 2/2016 | Narasimhan et al. | |

(Continued)

FOREIGN PATENT DOCUMENTS

| | | |
|---|---|---|
| WO | 2004029823 A1 | 4/2004 |
| WO | 2013152305 A1 | 10/2013 |
| WO | 2014040252 A1 | 3/2014 |

OTHER PUBLICATIONS

International Search Report dated Feb. 24, 2015, in International Patent Application No. PCT/US2014/040404 (4pgs).
(Continued)

*Primary Examiner* — Olumide Ajibade Akonai
(74) *Attorney, Agent, or Firm* — North Weber & Baugh LLP; Michael North

(57) ABSTRACT

Described is a method performed by a computing device for generating policies for improving network system performance, the method comprising: receiving operational data from a network device; processing the operational data from the network device to generate a Wi-Fi management policy; merging the Wi-Fi management policy, a mobile device policy, and a user preference or user policy to generate a unified policy; and sending the unified policy to the network device for network management.

18 Claims, 4 Drawing Sheets

(51) Int. Cl.

| | |
|---|---|
| *H04L 41/0813* | (2022.01) |
| *H04L 41/0823* | (2022.01) |
| *H04L 41/0893* | (2022.01) |
| *H04L 67/5682* | (2022.01) |
| *H04W 8/24* | (2009.01) |
| *H04W 24/04* | (2009.01) |
| *H04W 24/10* | (2009.01) |
| *H04W 28/18* | (2009.01) |
| *H04W 28/24* | (2009.01) |
| *H04W 84/12* | (2009.01) |
| *H04W 88/10* | (2009.01) |

(52) U.S. Cl.
CPC ........ *H04L 41/0893* (2013.01); *H04L 63/205* (2013.01); *H04L 67/5682* (2022.05); *H04W 8/245* (2013.01); *H04W 24/04* (2013.01); *H04W 24/10* (2013.01); *H04W 28/18* (2013.01); *H04W 28/24* (2013.01); *H04W 84/12* (2013.01); *H04W 88/10* (2013.01)

(58) Field of Classification Search
CPC . H04W 28/02; H04W 28/0215; H04W 28/24; H04W 24/04; H04W 36/26; H04W 4/50; H04W 8/183; H04W 24/10; H04W 72/0413; H04W 72/10; H04W 72/0453; H04W 72/082; H04W 52/281; H04W 48/16; H04W 16/00; H04W 16/28; H04W 72/121; H04W 8/245; H04W 28/18; H04W 88/10; H04L 41/0893; H04L 41/0813; H04L 41/0816; H04L 41/0823; H04L 67/306; H04L 41/0803; H04L 1/0026; H04L 1/0003; H04L 1/0009; H04L 2025/03426; H04L 1/0027; H04L 63/205; H04L 67/2852; H04L 67/5682; H04L 41/0894; H04M 15/66; H04B 7/0626; H04B 7/0632; H04B 7/0417; H04B 7/0452; H04B 7/0613

See application file for complete search history.

(56) References Cited

U.S. PATENT DOCUMENTS

| | | | |
|---|---|---|---|
| 9,621,587 B2 | 4/2017 | Roberts et al. | |
| 9,843,996 B2* | 12/2017 | Bergstrom | ............ H04W 76/10 |
| 2002/0177447 A1* | 11/2002 | Walton | ................. H04B 7/0626 |
| | | | 455/452.1 |
| 2003/0087673 A1* | 5/2003 | Walton | ................... H04B 7/061 |
| | | | 455/562.1 |
| 2004/0007247 A1 | 1/2004 | Asari et al. | |
| 2004/0023009 A1* | 2/2004 | Suzuki | ................... B42D 25/44 |
| | | | 428/195.1 |
| 2004/0125781 A1 | 7/2004 | Walter et al. | |
| 2004/0137908 A1* | 7/2004 | Sinivaara | ............... H04B 7/022 |
| | | | 455/517 |
| 2004/0198319 A1 | 10/2004 | Whelan et al. | |
| 2005/0165919 A1 | 7/2005 | Qian et al. | |
| 2007/0204324 A1 | 8/2007 | Roberts et al. | |
| 2008/0267144 A1 | 10/2008 | Jano et al. | |
| 2009/0049518 A1 | 2/2009 | Roman et al. | |
| 2011/0149879 A1* | 6/2011 | Noriega | ............ H04W 72/1236 |
| | | | 370/329 |
| 2012/0039262 A1 | 2/2012 | Walsh | |
| 2012/0230310 A1 | 9/2012 | Roy et al. | |
| 2013/0007247 A1 | 1/2013 | Roberts et al. | |
| 2013/0103827 A1* | 4/2013 | Dunlap | ............... H04L 41/0893 |
| | | | 709/224 |
| 2013/0322393 A1* | 12/2013 | Kishiyama | ............ H04L 5/0092 |
| | | | 370/329 |
| 2014/0080486 A1* | 3/2014 | Nitta | ..................... H04W 36/30 |
| | | | 455/436 |
| 2014/0094159 A1 | 4/2014 | Raleigh et al. | |
| 2014/0220967 A1 | 8/2014 | Pankajakshan et al. | |
| 2014/0233386 A1 | 8/2014 | Jamadagni et al. | |
| 2016/0227440 A1* | 8/2016 | Forssell | ................. H04W 28/08 |
| 2017/0048924 A1* | 2/2017 | Mate | ..................... H04W 84/12 |

OTHER PUBLICATIONS

Written Opinion of the International Searching Authority dated Feb. 24, 2015, in International Patent Application No. PCT/US2014/040404 (4pgs).

International Preliminary Report on Patentability dated Dec. 6, 2016, in International Patent Application No. PCT/US2014/040404 (6pgs).

Extended European Search Report dated Feb. 28, 2018 in European Patent Application No. 14893520.8 (12pgs).

The European Report in EP Application No. 14893520.8 dated Nov. 6, 2019, (5 pgs).

Extended European Search Report dated Mar. 16, 2021 in related European application No. 20194700.9, (9 pgs).

European office action, intend to grant a patent, dated Sep. 27, 2022 in related European patent application No. 20194700.9, (33 pgs).

* cited by examiner

METHOD AND APPARATUS FOR GENERATING POLICIES FOR IMPROVING NETWORK SYSTEM PERFORMANCE

CROSS-REFERENCE TO RELATED APPLICATIONS

This application is a continuation of previously filed copending U.S. patent application Ser. No. 15/315,364, entitled, "Method and Apparatus For Generating Policies for Improving Network System Performance," listing as inventors Wooyul Lee, Manikanden Balakrishnan, Sungho Yun, Carlos Garcia, and Ramya Bhagavatula, and filed Nov. 30, 2016, which application is the US 371 National Phase of International PCT Patent Application No. PCT/US2014/040404, filed May 30, 2014, which applications are hereby incorporated by reference in their entireties.

BACKGROUND

Network systems include an Access Point (AP) that receives broadband Internet from an Internet Service Provider (ISP) and provides wired and wireless access to the Internet for one or more communication devices (e.g., laptops, tablets, smart phones, etc.). The performance of the network system may degrade by one or more events. For example, when an unknown device tries to connect to the AP, it may create a security risk to the network system and may also slow down the speed of the Internet i.e., the throughput from the AP to the one or more communication devices may slow down. In current practice, the network systems are not centrally analyzed by a computing device to account for information such as historical information, knowledge of network component (or network structure) to generate policies for managing network performance. As a result, performance of current network systems may not be optimized for one or more events.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
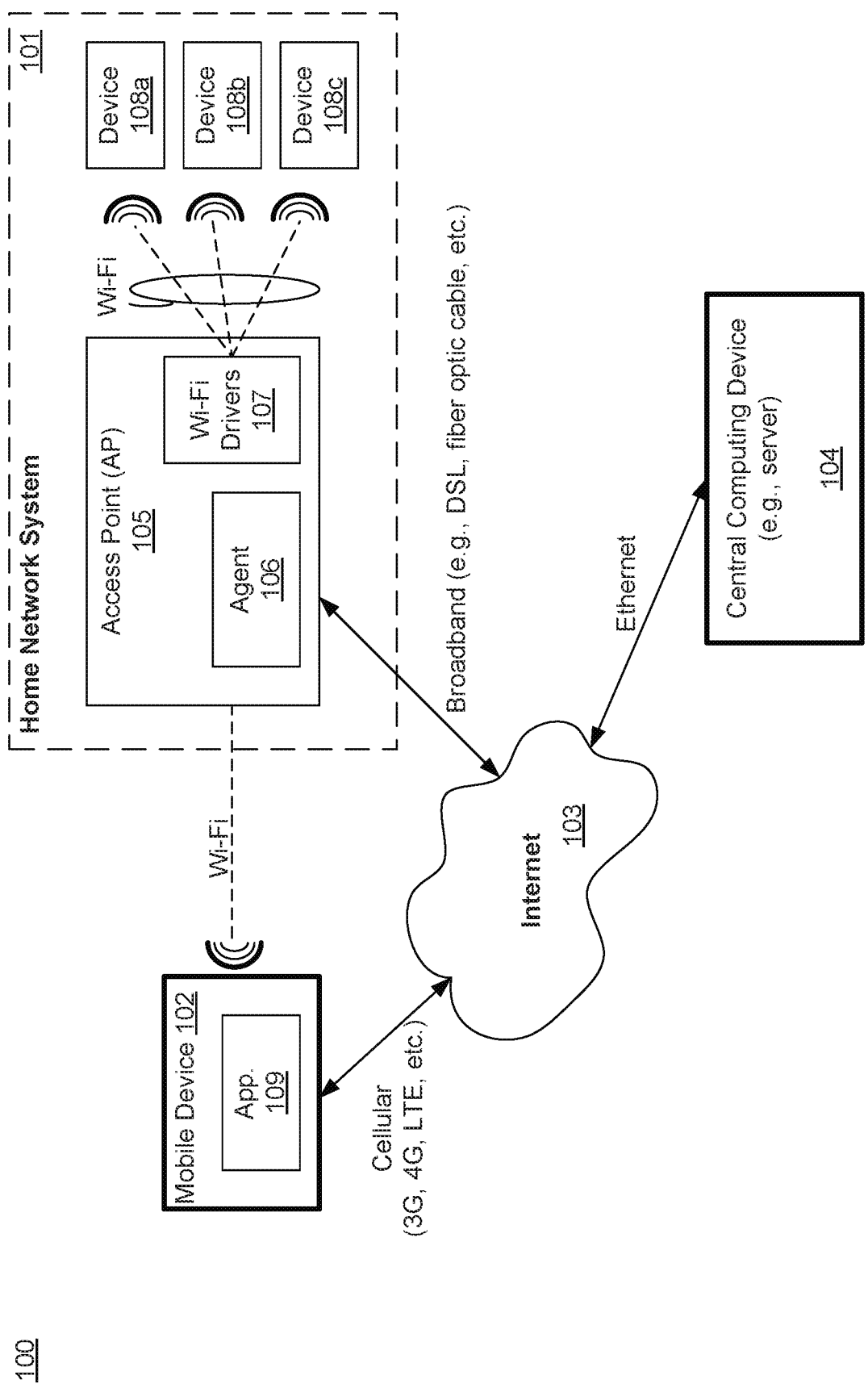
FIG. 1 illustrates a communication network having an apparatus for generating policies for improving network system, according to one embodiment of the disclosure.

Some embodiments describe a method and apparatus for generating policies for improving network system performance. In one embodiment, the method is performed by a computing device (e.g., a server) that receives operational data from a network device (e.g., an AP, a mobile device with Wi-Fi connectivity, a mobile device with cellular data connectivity, router, etc.), and processes that operational data to generate Wi-Fi management policy for one or more Wi-Fi communication devices. Examples of such operational data include transmission/reception counters, memory/CPU load, Wi-Fi signal strength, Wi-Fi link-speed, MCS (modulation and coding scheme) index, list of connected devices, security settings, operating standards (i.e. 802.11b, g, a, n, ac), connection/disconnection/reconnection events, Wi-Fi network scan data (e.g., list of neighboring APs along with their RSSI, and channels).

In one embodiment, the computing device receives user preference data and/or user policy. For example, the computing device receives the user preference data and/or user policy from one of a mobile device or a website. Examples of user preference data and/or user policy include degrees of importance a user places to the one or more Wi-Fi communication devices that are communicatively coupled to the network device, indication of the primary usage of such devices (i.e., video, or voice, or data, or peer-to-peer, surveillance camera, or sensors), user policy for bandwidth or usage control (e.g., limiting bandwidth to 10 Mbps, limiting usage between 8 PM~10 PM etc.). By knowing which Wi-Fi communication device is more important for their primary use to the user than others, the Wi-Fi management policy can be tailored to provide higher quality of service to the more important Wi-Fi communication devices.

In one embodiment, the computing device merges the Wi-Fi management policy, a mobile device policy, and the user preference or user policy to generate a unified policy. In one embodiment, the computing device sends the unified policy to the network device for network management (e.g., data collection, diagnostics, optimization, etc.). In one embodiment, broadband link in a router without Wi-Fi functionality can be optimized using a wired device to provide the user policy to be merged. One technical effect of network management using the unified policy is that the network system performance improves, leading to better network experience. Other technical effects will be apparent from the various embodiments described here.

The term "performance" generally refers to any one or more of network throughput (e.g., TCP/UDP), latency, jitter, connectivity, error rates, power consumption, transmit power, coverage, security, etc. Improving performance of the communication system includes increasing throughput, reducing error rate and latency, improving (i.e., reducing) jitter, reducing power consumption, increasing area of coverage, enhancing network security, etc. for the communicating system.

The term "Local Area Network" (LAN) generally refers to a computer or communication network that interconnects computers or communication devices in a limited area such as a home, school, computer laboratory, or office building using network media.

The term "Wide Area Network" (WAN) generally refers to a telecommunication network that covers a broad area (i.e., any network that links across metropolitan, regional, or national boundaries) compared to the limited area covered be a LAN.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" generally refers to two or more elements which are in direct contact (physically, electrically, magnetically, electromagnetically, optically, etc.). The term "coupled" generally may also refer to two or more elements that are not in direct contact with each other, but still cooperate or interact with each other.

Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 illustrates a communication network 100 having an apparatus for generating policies for improving network system, according to one embodiment of the disclosure. In one embodiment, communication network 100 comprises Home Network System 101, Mobile Device 102 (e.g., a smart phone), Internet 103, and Central Computing Device 104 (e.g., server). In one embodiment, Home Network System 101 comprises AP 105 and Wi-Fi enabled communication devices—Device 108a, Device 108b, and Device 108c. While the embodiment shows Wi-Fi enabled devices, AP 105 is also communicatively coupled to wired internet devices via, for example, Ethernet cable. Also, any number and type of Wi-Fi communication devices may be coupled to AP 105.

In one embodiment, AP 105 includes a storage unit having an Agent 106 stored thereon that when executed by a processor of AP 105 performs a method such as one described with reference to FIG. 3. Referring back to FIG. 1, in one embodiment, Agent 106 receives a unified policy from Central Computing Device 104 (e.g., server) and implements that management policy in the Home Network System 101 to improve Wi-Fi performance of the network system. In one embodiment, Agent 106 generates the unified policy by merging a management policy from Central Computing Device 104 with a user preference or user policy. For example, Agent 106 of AP 105 receives a management policy from Central Computing Device 104 via Internet 103, where AP 105 is communicatively coupled to Internet 103 by a broadband link (e.g., Digital Subscriber Line (DSL), fiber optic cable, etc.).

As part of the user preference or user policy, users of AP 105 can specify the importance or primary usage of certain devices so that Agent 106 can use it for its algorithm. For example, a user may specify to monitor connectivity of security alarm every minute and, maximize throughput for the Internet TV instead of laptops, etc. In one embodiment, Agent 106 is pre-installed in AP 105. For example, an ISP, or AP vendors may install Agent 106 in AP 105. In one embodiment, Agent 106 is a hardware processor. For example, Agent 106 is an ASIC (Application Specific Integrated Circuit) for performing a specific function of collecting real-time and some historical data and applying a unified policy for network management and/or generating a unified policy for network management using the collected data. In one embodiment, Agent 106 is downloadable software.

For example, Agent 106 is downloadable from the Internet and/or from any device communicatively connected to AP 105 through Wi-Fi or Ethernet. Agent 106 may store real time operational data associated with AP 105 so that it may cause AP 105 to react to sudden environmental changes. Examples of environmental changes include, new Wi-Fi router being installed in the neighborhood, microwave causing intermittent noise, connected device moved to a low-coverage area, neighboring Wi-Fi router or stations changing their operation (i.e., changing channel, moving location, suddenly increasing traffic, adding more stations, etc.

In one embodiment, AP 105 includes Wi-Fi Drivers 107 that control Wi-Fi hardware and provide interfaces for the operation system and application software (such as Agent 106) so that they can access the Wi-Fi functions, or retrieve Wi-Fi related information from the hardware. In one embodiment, Mobile Device 102 includes an application 109 (App.) for collecting data which can be used to generate the unified policy. For example, App. 109 can measure upload throughput from Mobile Device 102 (also called Wi-Fi station) to AP 105 (i.e., uplink), and this throughput data can be used for optimization and diagnostics.

Wi-Fi station also has its own operational data that may not be available in AP 105. For example, operational data such as RSSI, noise, interference, etc., are available to Wi-Fi stations. These operational data may be different from the data available from AP 105. For example, noise in AP 105 is the noise measured at the Wi-Fi interface of AP 105 while noise in Mobile Device 102 is the noise measured at Mobile Device 102, and they can be different. Likewise, interference in AP 105 is the interference measured at the Wi-Fi interface of AP 105 while interference in Mobile Device 102 is the interference measured at Mobile Device 102, and they can be different.

In one embodiment, data collected by App. 109 is sent to AP 105 and/or Central Computing Device 104 to improve network management algorithms. For example, Mobile Device 102 sends data collected by App. 109 to Central Computing Device 104 via a cellular network (e.g., 3rd Generation (3G), 4th Generation (4G), Long Term Evolution (LTE), etc.) and Internet 103. In one embodiment, Mobile Device 102 and AP 105 can also send and receive data through the Wi-Fi connection between the two devices. Here, App. 109 can be a preinstalled application in Mobile Device 102, or a downloadable application for Mobile Device 102. For example, App. 109 can be downloaded from an App Store (e.g., App. Store by Apple®).

In one embodiment, App. 109 generates a mobile policy using its own priority, data, or user preference. For example, App. 109 may determine that the Wi-Fi hardware in Mobile Device 102 is only capable of operating at 2.4 GHz, and generates an optimization policy that limits optimization of the Wi-Fi network within 2.4 GHz. In one embodiment, this optimization policy is sent to Agent 106 (via a Wi-Fi connection), and Agent 106 merges the mobile policy (i.e., the optimization policy from App. 109) with any existing policy for band and channel optimization received from Central Computing Device 104 to generate a unified policy. In such an embodiment, Agent 106 then applies the unified policy to Home Network System 101.

In another example, App. 109 may determine that the available battery life in Mobile Device 102 is very low, and generates a data collection policy that limits the active data collection by Agent 106 for the Mobile Device 102. Active data collection can consume additional power of Mobile Device 102 because it has to awake from sleep mode. In one embodiment, App 109 can also generate an optimization policy that reduces the power consumption of Mobile Device 102. For example, App 109 can generate an optimization policy that causes AP 105 to increase its beacon interval.

Figure 2:
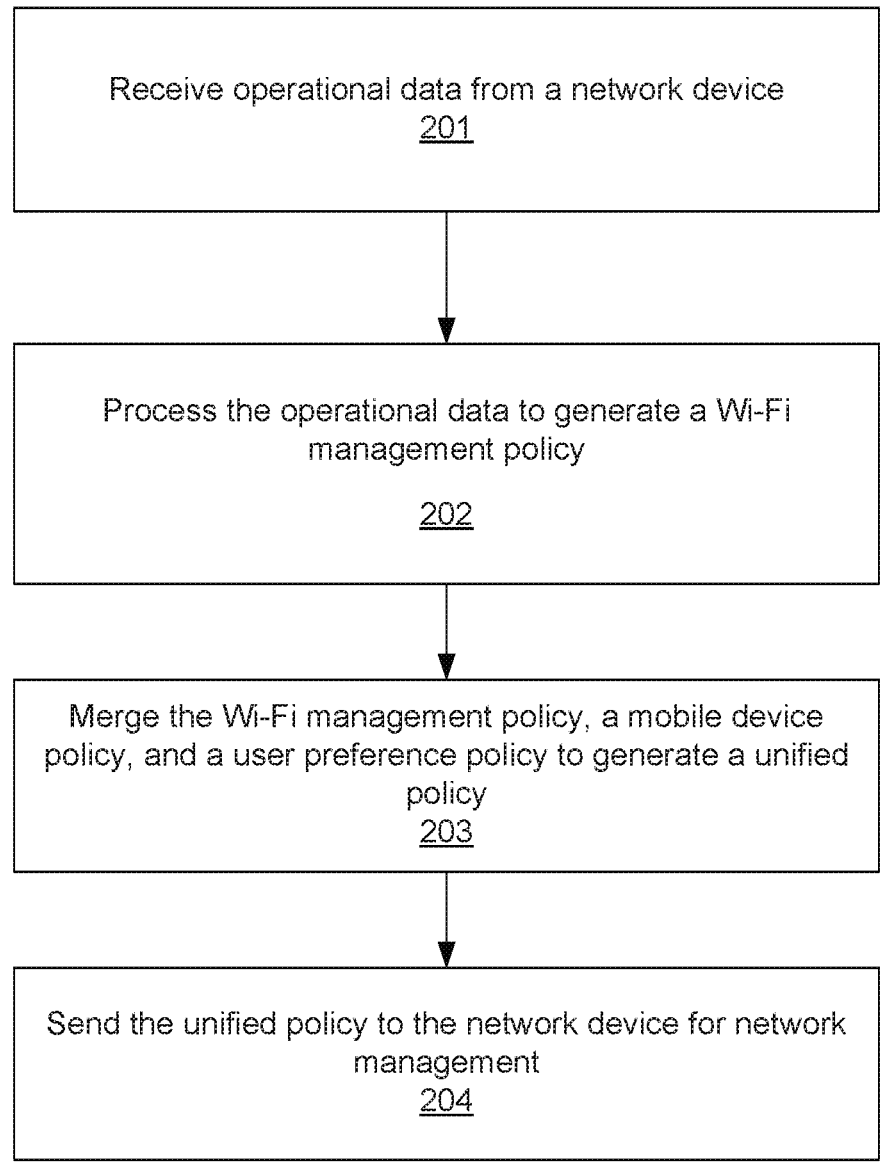
FIG. 2 illustrates a method for improving broadband experience, according to one embodiment of the disclosure.

FIG. 2 illustrates a method 200 for improving broadband (and/or Wi-Fi) experience, according to one embodiment of the disclosure. Although the blocks in the flowcharts with reference to FIG. 2 are shown in a particular order, the order of the actions can be modified. Thus, the illustrated embodiments can be performed in a different order, and some actions/blocks may be performed in parallel. Some of the blocks and/or operations listed in FIG. 2 are optional in accordance with certain embodiments. The numbering of the blocks presented is for the sake of clarity and is not intended to prescribe an order of operations in which the various blocks must occur. Additionally, operations from the various flows may be utilized in a variety of combinations. FIG. 2 is described with reference to FIG. 1. In this embodiment, method 200 is performed by Central Computing Device 104 (e.g., server in a cloud).

At block 201, Central Computing Device 104 receives operational data from a network device (e.g., AP 105) over the Internet 103. For example, an ingress port (or receiver) of Central Computing Device 104 receives packets of operational data from the network device. Examples of operational data include transmission/reception counters, memory/CPU load, Wi-Fi signal strength, Wi-Fi link-speed, MCS (modulation and coding scheme) index, list of connected devices, security settings, operating standards (i.e. 802.11b, g, a, n, ac), connection/disconnection/reconnection events, and Wi-Fi network scan data (e.g., list of neighboring APs along with their RSSI, and channels).

At block 202, Central Computing Device 104 processes the operational data from the network device to generate a Wi-Fi management policy for the one more Wi-Fi enabled communication devices (e.g., Devices 108a/b/c). Central computing device 104 also stores historical data collected from Agent 106 as well as from other agents installed on other routers. Central computing device 104 uses these data along with the operational data collected to generate management policy.

Here, Central Computing Device 104 includes a processor (e.g., Intel processor) to process the operational data. The Wi-Fi management policies include policies for managing activities of Network. Examples of Wi-Fi management policies include data collection, diagnostics, optimization, and notification. Data collection policies may depend on the device type and/or device status. For example, data collection policy may dictate that throughput data should not be collected from security devices. Data collection policy may also dictate that more throughput data should be collected when throughput falls below a threshold (e.g., 5 Mbps).

Diagnostic policy may be used to identify issues based on collected data by Central Computing Device 104, App. 109 of Mobile Device 102, Agent 106 of AP 105, or by any combination of them. In one embodiment, Agent 106 of AP 105 generates diagnostics to give an immediate (or real-time) notification to the consumers (e.g., users of Devices 108a/b/c and Mobile Device 102) and/or to App. 109 of Mobile Device 102. For example, Agent 106 may raise a flag when an unknown device tries to connect to AP 105 more than a predefined number of times within a predefined number of hours. In this example, the diagnostic policy defines the predefined number of times and the predefined number of hours.

Optimization policy provides guidance (e.g., thresholds) for algorithms that improve performance of Home Network System 101. For example, optimization policy may dictate Agent 106 to change channel if throughput is below a threshold (e.g., 3 Mbps) and when there is no active user internet traffic in the network. Optimization policy may include changing of parameters or taking actions in AP 105. Optimization policy may also include actions that can be taken by App. 109 in Mobile Device 102.

Notification policy provides policies for AP 105 for informing users of the Wi-Fi (e.g., App. 109, Devices 108a/b/c, etc.) when certain conditions are met. Examples of such certain conditions are output of diagnostics (e.g., when throughputs of all Wi-Fi communication devices have dropped below a minimum threshold), output of data collection (e.g., when data over Wi-Fi suddenly increases).

In one embodiment, Central Computing Device 104 also receives mobile device policy. For example, Central Computing Device 104 receives the mobile policy through its ingress port (e.g., receiver). In one embodiment, mobile device policy may be generated by App. 109 of Mobile Device 102. In one embodiment, App. 109 may generate a mobile device policy that may not exist in Central Computing Device 104. For example, App. 109 may add a condition such as "do action 'x' if event 'y' happens." In one embodiment, App. 109 may want to get a notification from AP 106 if a security device stops connecting. App. 109 may want to reduce the frequency of broadband test to once per day even through Central Computing Device 104 may have a policy of running the broadband test once per hour.

At block 203, Central Computing Device 104 merges the Wi-Fi management policy (i.e., policies for data collection, diagnostics, optimization, and notification), the mobile device policy, and the user preference or user policy to generate a unified policy. In one embodiment, the process of merging is performed by the processor of the Central Computing Device 104 or by another logic. At block 204, Central Computing Device 104 sends the unified policy over Internet 103 to network device 105 for network management. For example, Central Computing Device 104 sends the unified policy over the egress port (e.g., transmitter) to network device 105 (e.g., AP 105).

Figure 3:
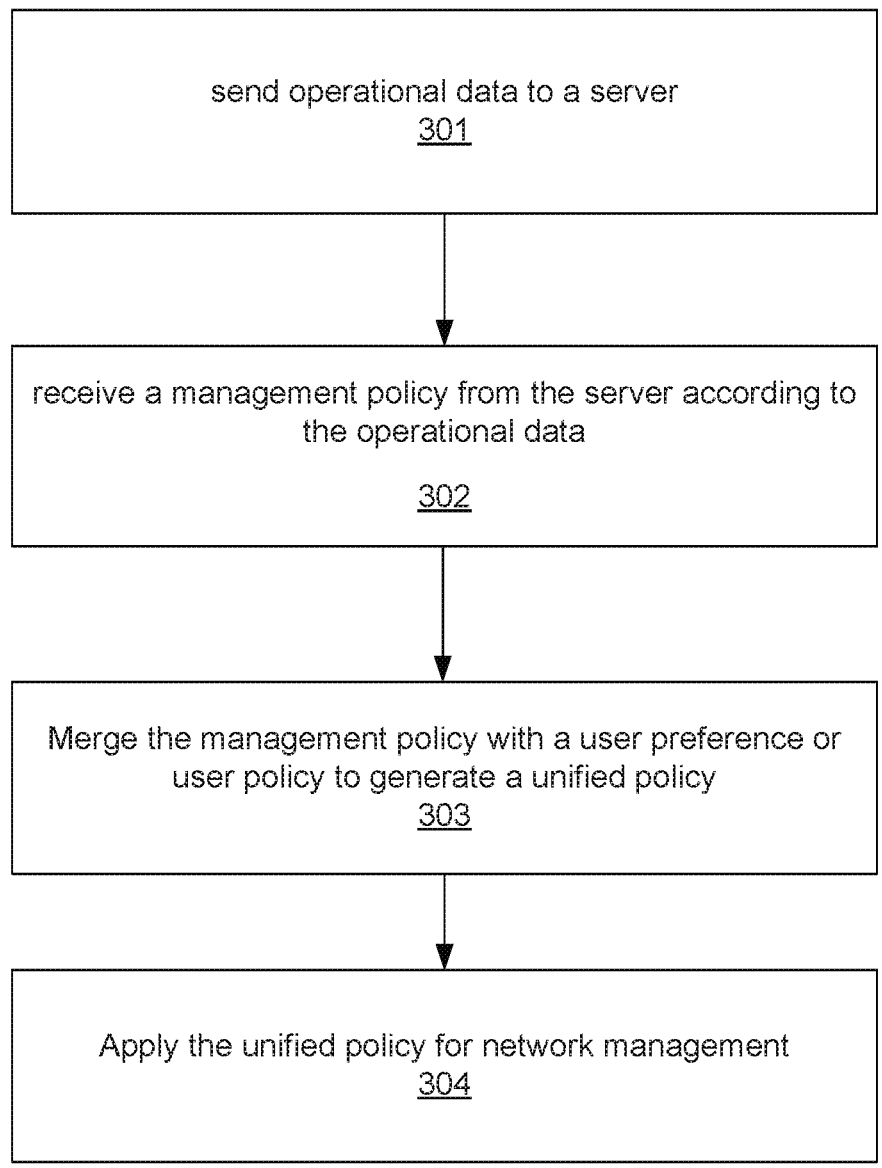
FIG. 3 illustrates a method for improving broadband experience, according to another embodiment of the disclosure.

FIG. 3 illustrates a method 300 for improving broadband experience, according to another embodiment of the disclosure. Although the blocks in the flowcharts with reference to FIG. 3 are shown in a particular order, the order of the actions can be modified. Thus, the illustrated embodiments can be performed in a different order, and some actions/blocks may be performed in parallel. Some of the blocks and/or operations listed in FIG. 3 are optional in accordance with certain embodiments. The numbering of the blocks presented is for the sake of clarity and is not intended to prescribe an order of operations in which the various blocks must occur. Additionally, operations from the various flows may be utilized in a variety of combinations. FIG. 3 is described with reference to FIG. 1. In this embodiment, method 300 is performed by Agent 106 of AP 105.

At block 301, AP 105 sends operational data over Internet 103 to Central Computing Device 104. Examples of operational data include transmission/reception counters, memory/CPU load, Wi-Fi signal strength, Wi-Fi link-speed, MCS (modulation and coding scheme) index, list of connected devices, security settings, operating standards (i.e. 802.11b, g, a, n, ac), connection/disconnection/reconnection events, and Wi-Fi network scan data (e.g., list of neighboring APs along with their RSSI, and channels).

At block 302, AP 105 receives management policy from Central Computing Device 104 according to the operational data. The Wi-Fi management policies include policies for data collection, diagnostics, optimization, and notification. Wi-Fi management policies are maintained by Central Computing Device 104 and are sent to AP 105 so that, in one embodiment, Agent 106 can merge the Wi-Fi management policies with other policies to form a unified policy.

At block 303, AP 105 merges the management policy with user preference or user policy to generate a unified policy. User preference or user policy can specify the importance of certain devices so that Agent 106 can use it for its algorithm. At block 304, AP 105 applies the unified policy for network management.

The unified policy may include Optimization policy. Optimization policy may include changing of parameters (e.g., channel power) or taking actions (e.g., restart Wi-Fi connectivity, reboot AP 105, change frequency band of AP 105, etc.). For example, Agent 106 may decide that Mobile Device 102 should move to a first frequency band (e.g., 5 GHz) instead of second frequency band (e.g., 2.4 GHz). Since AP 105 may not be able to enforce this frequency band change, AP 105 may send this frequency band change request to App. 109 and request App. 109 to enforce the change to the second frequency band. In this example, App. 109 of Mobile Device 102 and Agent 106 in AP 105 jointly optimize the Wi-Fi link by sharing the information and controls.

In one embodiment, Agent 106 receives policies from both Central Computing Device 104 (i.e., Wi-Fi management policy) and App. 109 (i.e., mobile device policy), and merges these policies to form the unified policy for network management. For example, App. 109 (or consumer of that application) may want to reduce the frequency of broadband test to once per day even though the Wi-Fi management policy from Central Computing Device 104 dictates a broadband test of once per hour. In this example, instead of modifying Wi-Fi management policy only for App. 109, Agent 106 combines two polices based on the priorities i.e., Agent 106 may elect to collect broadband test data once per day as directed by App. 109.

The unified policy may also include diagnostic policy. As described above, diagnostic policy may be used to identify issues based on collected data jointly. For example, if the throughput from Mobile Device 102 to AP 105, as measured by App. 109, is high but the throughput from AP 105 to Mobile Device 102, as measured by Agent 106, is low then it is likely that there is a specific issue with the transmit (TX) part of AP 105 (e.g., in Wi-Fi Drivers 107). In this example, because Wi-Fi throughput in one direction is better than Wi-Fi throughput in another direction, the diagnostic policy may conclude that there is no Wi-Fi congestion. Wi-Fi is a symmetric medium and both uplink and downlink communications use the same carrier-frequency and bandwidth. Thus, if the Wi-Fi link is congested, throughput from both directions (uplink/downlink) should be low. If not, it suggests a device specific problem rather than a link performance issue.

RSSI (Received Signal Strength Indicator) is an indication of received signal strength. In Wi-Fi, both transmitters and receivers use the same frequency band. So, the diagnostic policy may indicate that both AP 105 and Mobile Device 102 should measure similar RSSI at both transmitter and receiver ends even through there can be slight differences due to different antenna capability of AP 105 or Mobile Device 102. However, if RSSI measured at Mobile Device 102 is low, but RSSI measured at AP 105 is high, the diagnostic policy may indicate that there is a specific problem with the transmitter of AP 105, or the receiver at Mobile Device 102.

In one embodiment, Central Computing Device 104, Agent 106, and App. 109 can manage the network jointly. In this embodiment, communication paths exist between the three components—Central Computing Device 104, Agent 106, and App. 109. In one embodiment, the diagnostic policy (which is part of the Wi-Fi management policy) may also be used for diagnostics of when one of the communication paths is broken. For example, when the broadband service is down (i.e., communication path between Central Computing Device 104 and Agent 106 is broken), or when Wi-Fi is down (i.e., communication path between Agent 106 and App. 109 is broken), or when cellular network is down (i.e., communication path between App. 109 and Central Computing Device 104) is broken, then the diagnostic policy may allow each component to use another communication path and diagnose/notify the problem of the broken link.

Consider the example when Wi-Fi is down, then Agent 106 and App. 109 cannot connect with each other. In this example, the diagnostic policy may allow App. 109 to report the problem (that Wi-Fi is down) to Central Computing Device 104 via the cellular connectivity. In such an embodiment, Central Computing Device 104 collects data from Agent 106 to determine the issue, and guide Agent 106 to fix the Wi-Fi issue. For example, Agent 106 may fix the Wi-Fi issue by restarting AP 105 or restarting Wi-Fi Drivers 107. In another example, though Wi-Fi is up and operating, users may lose their password to connect to AP 105. In that case, App. 109 or any other station without correct password may not connect to AP 105. In one embodiment, App. 109, which can connect to Central Computing Device 104, can reset or retrieve the password through Agent 106, and send it back to App 109.

Considering the example when broadband (e.g., DSL, fiber optic cable, etc.) is down, then Agent 106 and Central Computing Device 104 may not communicate directly. In this example, diagnostic policy may dictate that App. 109 connect to Agent 106 via Wi-Fi, and connect to Central Computing Device 104 using the cellular network (e.g., 3G, 4G, LTE, etc.). Here, since Agent 106 is not directly connecting to Central Computing Device 104, the diagnostic policy may dictate the Central Computing Device 104 to send a notification to App. 109. App. 109 then sends an action (i.e. policy) to Agent 106 to fix the issue (such as restart AP 105 to fix the broadband issue), or notify the users to fix the broadband issue, or notify the broadband service provider.

Figure 4:
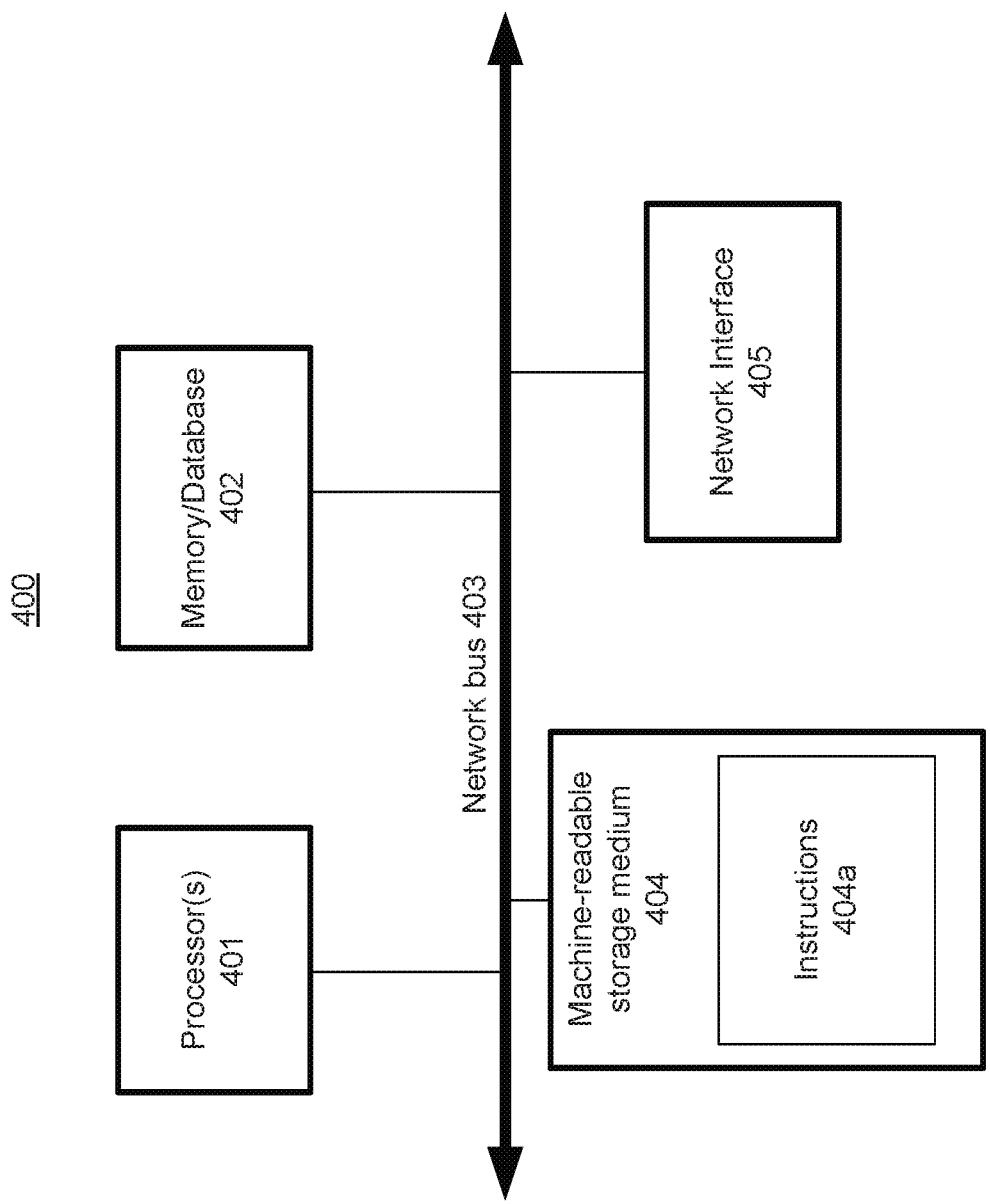
FIG. 4 is a processor-based system having machine-readable storage medium with computer executable instructions to perform the processes and methods, according to one embodiment of the disclosure.

FIG. 4 is a processor-based system 400 having a machine-readable storage medium with computer executable instructions to perform the processes and methods, according to one embodiment of the disclosure. In one embodiment, processor-based system 400 comprises a processor(s) 401, memory/database 402, network bus 403, machine-readable storage medium 404, and network interface 405. In one embodiment, processor-based system 400 is part of one or more devices in User Broadband Network 101. In one embodiment, processor-based system 400 is part of the server having the Cloud Recommendation Engine 102.

In one embodiment, machine-readable storage medium 404 and associated computer executable instructions 404a may be in any of the communication devices and/or servers discussed herein. The computer-machine-readable/executable instructions 404a are executed by processor 401. Elements of embodiments are provided as machine-readable medium for storing the computer-executable instructions (e.g., instructions to implement the flowcharts and other processes discussed in the description).

In one embodiment, database 402 is operable to store data used by the instructions 404a (also called software code/instructions). In one embodiment, network interface 405 is operable to communicate with other devices. In one embodiment, the components of processor-based system 400 communicate with one another via network bus 403.

The machine-readable storage medium 404 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Program software code/instructions 404a executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software." The program software code/instructions 404a typically include one or more instructions stored at various times in various tangible memory and storage devices in, or peripheral, to the computing device, that, when fetched/read and executed by the computing device, as defined herein, cause the computing device to perform functions, functionalities and operations necessary to perform a method, so as to execute elements involving various aspects of the function, functionalities, and operations of the method(s) forming an aspect of the disclosed subject matter.

For the purposes of this disclosure a module is a software, hardware, or firmware (or combinations thereof) system, process or functionality, or component thereof, that performs or facilitates the processes, features, and/or functions, functionalities and/or operations described herein (with or without human interaction or augmentation) as being performed by the identified module. A module can include sub-modules. Software components of a module may be stored on a tangible machine readable medium (e.g., 404). Modules may be integral to one or more servers, or be loaded and executed by one or more servers. One or more modules may be grouped into an engine or an application.

A tangible machine readable medium (e.g., 404) can be used to store program software code/instructions (e.g., 404a) and data that, when executed by a computing device 400, cause the computing device 400 to perform a method(s) as may be recited in one or more accompanying claims directed to the disclosed subject matter. The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices.

Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), and Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system 400 is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, a method performed by a computing device for generating policies for improving network system performance is provided. In one embodiment, the method comprises: receiving operational data from a network device; processing the operational data from the network device to generate a Wi-Fi management policy; merging the Wi-Fi management policy, a mobile device policy, and a user preference or user policy to generate a unified policy; and sending the unified policy to the network device for network management.

In one embodiment, the network device is one of: an access point (AP); a router; a mobile device with Wi-Fi connectivity; or a mobile device with cellular data connectivity. In one embodiment, the operational data is received from an agent in the network device. In one embodiment, the method further comprises receiving operational data from a mobile device. In one embodiment, the method comprises receiving the user preference or user policy. In one embodiment, the method further comprises receiving the user preference or user policy from at least one of mobile device or a web site.

In one embodiment, the unified policy is one or more of: policy for collecting data; policy for diagnostics; policy for optimization; or policy for notification of diagnostics. In one embodiment, the computing device is one of a server or a mobile device.

In another example, a computer readable storage medium is provided having instructions stored thereon, that when executed, causes a processor to perform the method described above.

In another example, a method performed by an access point (AP) for generating policies for improving network system performance is provided. In one embodiment, the method comprises: sending operational data to a server; receiving a management policy from the server according to the operational data sent to the server; merging the management policy with a user preference or user policy to generate a unified policy; and applying the unified policy for network management. In one embodiment, the method further comprises receiving user preference or user policy from a mobile device.

In one embodiment, the operation data includes operational data stored in the AP. In one embodiment, the method further comprises collecting operational data from one or more Wi-Fi devices communicatively coupled to the AP. In one embodiment, the server receives additional data from a mobile device. In one embodiment, the unified policy is one or more of: policy for collecting data; policy for diagnostics; policy for optimization; or policy for notification of diagnostics.

In another example, a computer readable storage medium is provided having instructions stored thereon, that when executed, causes a processor to perform the method discussed above.

In another example, a central computing device for generating policies for improving network system performance is provided. In one embodiment, the central computing device comprises: a receiver for receiving operational data from a network device; a processor, coupled to the receiver, for processing the operational data from the network device to generate a Wi-Fi management policy; logic for merging the Wi-Fi management policy, a mobile device policy, and a user preference or user policy to generate a unified policy; and a transmitter, coupled to the processor, for sending the unified policy to the network device for network management.

In one embodiment, the network device is one of: an access point (AP); a router; a mobile device with Wi-Fi connectivity; or a mobile device with cellular data connectivity. In one embodiment, the operational data is received from an agent in the network device. In one embodiment, the central computing device further comprises logic for receiving operational data from a mobile device. In one embodiment, the central computing device further comprises logic for receiving the user preference or user policy. In one embodiment, receiving the user preference or user policy is from at least one of mobile device or a website. In one embodiment, the unified policy is one or more of: policy for collecting data; policy for diagnostics; policy for optimization; or policy for notification of diagnostics. In one embodiment, the central computing device is one of a server or a mobile device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. A method for defining unified policy control across a wireless network having a variety of different types of wireless devices, the method comprising:
   receiving a first set of operational data from a first wireless device within a first plurality of wireless devices having a first type within the variety of different types;
   receiving a second set of operational data from a second wireless devices within a second plurality of wireless devices having a second type within the variety of types;
   monitoring radio uplink characteristics of both the first and second wireless devices;
   monitoring wired broadband performance associated with traffic received from the first and second wireless devices;
   defining the unified policy control across the first and second plurality of wireless devices based at least in part on the first set of operational data, the second set of operational data, the radio uplink characteristics, and the wired broadband performance; and using a broadband interface to communicate uplink communication from the first plurality of wireless devices and the second plurality of wireless devices across a wired broadband connection that has measurable third operational data that is used to generate the unified policy.

2. The method of claim 1 wherein the first set of operational data comprises a power transmission level associated with the first wireless device.

3. The method of claim 1 wherein the first set of operational data comprises security parameters associated with the first wireless device.

4. The method of claim 1 further comprising the steps of:
receiving at least one user-selectable quality-of-service parameter related to the first wireless device; and
updating the unified policy control based at least in part on the at least one user-selectable quality-of-service parameter.

5. The method of claim 4 wherein the first wireless device modifies uplink transmission to a frequency band in response to performance failing to satisfy the at least one user-selectable quality-of-service parameter.

6. The method of claim 1 wherein the first wireless device is prioritized over the second wireless device within the unified policy control and scheduling routine.

7. The method of claim 1 wherein the unified policy control jointly manages uplinks for the first and second wireless devices and manages the wired broadband performance.

8. A wireless access point comprising:
a first set of wireless interfaces that communicates with a first set of wireless devices, the first set of wireless devices comprising a first throughput, the first set of wireless interfaces receives first operational data from the first set of wireless devices;
a second set of wireless interfaces that communicates with a second set of wireless devices, the second set of wireless devices comprising a second throughput that is different from the first throughput, the second set of wireless interfaces receives second operational data from the second set of wireless devices;
a mobile interface that communicates with a cellular device that receives performance information comprising the first and second throughputs and radio uplink characteristics of both the first and second set of wireless devices;
an agent that implements a unified policy that, based on at least one of the performance data associated with a first frequency band used by the first set of wireless devices, performance data associated with the second frequency band used by the second set of wireless devices, and third performance data associated with a wide-area-network, the first operational data, and the second operational data, jointly manages communication from the first set of wireless devices and the second set of wireless devices; and
a broadband interface that couples the wireless access point to the wide-area-network.

9. The wireless access point of claim 8 wherein a first power level is associated with the first set of wireless devices and a second power level is associated with the second set of wireless devices.

10. The wireless access point of claim 8 wherein the unified policy is received from a server coupled via cloud-based channel.

11. The wireless access point of claim 8, wherein the wide-area-network transmits traffic from the first and second wireless devices.

12. The wireless access point of claim 8 wherein a first security level is associated with the first set of wireless devices and a second security level is associated with the second set of wireless devices.

13. The wireless access point of claim 8 further wherein quality-of-service parameters are communicated to the wireless access point from the cellular device to update the unified policy.

14. The wireless access point of claim 8 wherein the unified policy comprises permitting at least one of choosing a different communication path, diagnosing a broken communications link, or generating a notification regarding a broken communications link.

15. A network device comprising:
a first set of wireless interfaces that communicate with a first plurality of wireless devices, the first plurality of wireless devices comprising a first throughput and providing first operational data to the network device;
a second set of wireless interfaces that communicate with a second plurality of wireless devices, the second set of wireless devices comprising a second throughput and providing second operational data to the network device, the second throughput being different from the first throughput;
a network performance manager coupled to measure network performance across a network comprising the first and second wireless device;
a policy manager coupled to implement a unified policy based at least in part on the first and second operational data, radio uplink characteristics, and the measured network performance; and
a broadband interface coupled to communicate uplink communication from the first plurality of wireless devices and the second plurality of wireless devices across a wired broadband connection, the wired broadband connection having measurable third operational data that is used to generate the unified policy.

16. The network device of claim 15 wherein the network device receives the unified policy from a network-coupled server.

17. The network device of claim 15 wherein the first and second plurality of wireless interfaces operate in accordance with at least one cellular standard.

18. The network device of claim 15 wherein the first and second operational data comprises transmission power levels.

* * * * *